US009698428B2

(12) United States Patent
Huang

(10) Patent No.: US 9,698,428 B2
(45) Date of Patent: Jul. 4, 2017

(54) CATALYST SUPPORT PARTICLE STRUCTURES

(71) Applicant: Nissan North America, Inc., Franklin, TN (US)

(72) Inventor: Kan Huang, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 296 days.

(21) Appl. No.: 14/613,430

(22) Filed: Feb. 4, 2015

(65) Prior Publication Data
US 2016/0226076 A1  Aug. 4, 2016

(51) Int. Cl.
*H01M 4/92* (2006.01)
*H01M 4/88* (2006.01)

(52) U.S. Cl.
CPC ......... *H01M 4/925* (2013.01); *H01M 4/8807* (2013.01); *H01M 4/923* (2013.01)

(58) Field of Classification Search
CPC ..... H01M 4/925; H01M 4/8807; H01M 4/923
See application file for complete search history.

(56) References Cited

U.S. PATENT DOCUMENTS

| 6,007,934 | A | 12/1999 | Auer et al. |
| 6,855,453 | B2 | 2/2005 | Bett et al. |
| 6,936,370 | B1 | 8/2005 | Knights et al. |
| 7,767,330 | B2 | 8/2010 | Merzougui et al. |
| 2003/0198849 | A1 | 10/2003 | Hampden-Smith et al. |
| 2004/0018416 | A1* | 1/2004 | Choi ............... B82Y 30/00 429/524 |
| 2005/0287418 | A1 | 12/2005 | Noh et al. |
| 2006/0188775 | A1 | 8/2006 | Mance et al. |
| 2006/0257719 | A1* | 11/2006 | Merzougui ........ H01M 4/8605 429/442 |
| 2007/0037041 | A1 | 2/2007 | Cai et al. |
| 2007/0160896 | A1* | 7/2007 | Malak ............... H01M 8/02 429/400 |
| 2008/0145732 | A1 | 6/2008 | Lopes Correia Tavares et al. |

(Continued)

FOREIGN PATENT DOCUMENTS

CA   2857111 A1   6/2013
EP   2426763 A1   3/2012

(Continued)

OTHER PUBLICATIONS

T. Yanagishita, Carbon Nanotubes with a Triangular Cross-section, Fabricated Using Anodic Porous Alumina as the Template, Mar. 5, 2004 Advanced Materials.*

(Continued)

*Primary Examiner* — Sarah A Slifka
*Assistant Examiner* — Brian Ohara
(74) *Attorney, Agent, or Firm* — Young Basile Hanlon & MacFarlane, P.C.

(57) ABSTRACT

Electrocatalysts for use in fuel cell membrane electrode assemblies include a support substrate comprising a metal oxide nanotube having an internal support surface and conductive metal oxide particles impregnated on the internal support surface. Fuel cell electrodes are produced using the electrocatalyst coated on a gas diffusion layer.

17 Claims, 3 Drawing Sheets

(56) References Cited

U.S. PATENT DOCUMENTS

| | | | |
|---|---|---|---|
| 2011/0223519 A1* | 9/2011 | Kang | H01M 4/9033 |
| | | | 429/483 |
| 2013/0017473 A1 | 1/2013 | Kim et al. | |
| 2013/0022890 A1 | 1/2013 | Kundu et al. | |
| 2013/0122401 A1 | 5/2013 | Pietron et al. | |
| 2014/0045678 A1 | 2/2014 | Kumta et al. | |
| 2014/0065516 A1 | 3/2014 | Mavrikakis et al. | |
| 2014/0349203 A1* | 11/2014 | Klose-Schubert | H01M 4/9016 |
| | | | 429/418 |

FOREIGN PATENT DOCUMENTS

| | | | |
|---|---|---|---|
| EP | 2477264 | A2 | 7/2012 |
| EP | 2608298 | A1 | 6/2013 |
| WO | 2011122757 | A2 | 10/2011 |
| WO | 2013092568 | A1 | 6/2013 |

OTHER PUBLICATIONS

D.A. McKeown et al., "Struture of Hydrous Ruthenium Oxides: Implications for Charge Storage", J. Phys. Chem. B, 1999, 103 (23), pp. 4825-4832.

F.C. Walsh et al., "The continuing development of Magneli phase titanium sub-oxides and Ebonex electrodes", Electrochimica Acta 55 (2010) pp. 6342-6351.

* cited by examiner

CATALYST SUPPORT PARTICLE STRUCTURES

TECHNICAL FIELD

This disclosure relates to support particle structures for fuel cell catalyst, and in particular, to support structures that can prevent leaching of conductive materials and promote adhesion of active catalyst material.

BACKGROUND

Carbon has traditionally been the most common material of choice for polymer electrolyte fuel cell (PEFC) electrocatalyst supports due to its low cost, high abundance, high electronic conductivity, and high Brunauer, Emmett, and Teller (BET) surface area, which permits good dispersion of platinum (Pt) active catalyst particles. However, the instability of the carbon-supported platinum electrocatalyst due at least in part to carbon corrosion is a key issue that currently precludes widespread commercialization of PEFCs for automotive applications.

The adverse consequences of carbon corrosion include (i) platinum nanoparticle agglomeration/detachment; (ii) macroscopic electrode thinning/loss of porosity in the electrode; and (iii) enhanced hydrophilicity of the remaining support surface. The first results in loss of catalyst active surface area and lower mass activity resulting from reduced platinum utilization, whereas the second and third result in a lower capacity to hold water and enhanced flooding, leading to severe condensed-phase mass transport limitations. Clearly, both consequences directly impact PEFC cost and performance, especially in the context of automotive stacks.

To address the issues with carbon-based catalyst, non-carbon alternatives are being investigated. However, non-carbon alternatives are typically more costly, and conventional catalyst structures continue to allow leaching, agglomeration and corrosion of the catalyst materials.

SUMMARY

Embodiments of electrocatalyst for use in fuel cell membrane electrode assemblies are disclosed. One embodiment of an electrocatalyst includes a support substrate comprising a metal oxide nanotube having an internal support surface and conductive metal oxide particles impregnated on the internal support surface. The metal oxide nanotube can be a non-conductive metal oxide that provides surface area for depositing active catalyst particles. The conductive metal oxide particles provide electron conductivity.

Electrodes are also disclosed comprising an embodiment of an electrocatalyst disclosed herein coated on a gas diffusion layer.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

Conventional catalyst support structures include a substrate on which material is deposited. The substrate should have high surface area and be stable in the operating conditions of the fuel cell. A non-carbon catalyst support structure will typically provide conductive metal oxides deposited on a non-conductive metal oxide, such as titanium dioxide. The conductive metal oxide provides the requisite electron conduction while the non-conductive metal oxide provides the surface area required to support an active catalyst particle such as platinum. While these conventional catalyst support structures of metal oxides can provide the requisite conductivity while being stable, the conductive metal oxide carried by the non-conductive metal oxide remains susceptible to conventional problems with deposited materials, such as leaching and corrosion, while the non-conductive metal oxide is susceptible to agglomeration. In addition, the active catalyst particles supported on the support particles are susceptible to migration and agglomeration, resulting in loss of catalytic activity.

Disclosed herein are embodiments of electrocatalysts having support substrates with structures optimized to reduce leaching, agglomeration and corrosion. The support structures disclosed reduce or eliminate leaching of conductive materials, promote adhesion of active catalyst material and reduce or prevent the agglomeration of the non-conductive materials.

Figure 1A:
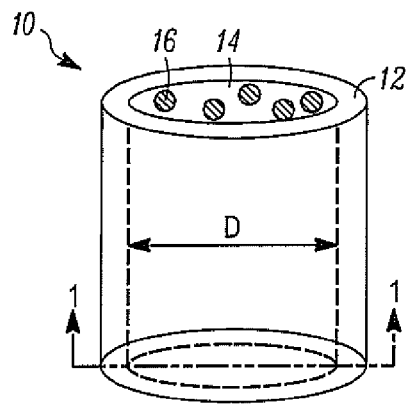
FIG. 1A is a schematic illustrating an embodiment of a support substrate for an electrocatalyst as disclosed herein.

FIG. 1A is a schematic of a support substrate 10 disclosed herein. The support substrate 10 comprises a metal oxide nanotube 12 having an internal support surface 14 with conductive metal oxide particles 16 impregnated on the internal support surface 14. Impregnating the conductive metal oxide particles 16 on the internal support surface 14 of the metal oxide nanotube 14 reduces leaching of the conductive metal oxide particles 16 and reduces corrosion of the conductive metal oxide particles 16 by shielding the particles 16 from the corrosive media.

The metal oxide nanotube 12 can be a non-conductive metal oxide that provides a high surface area structure on which to support active catalyst particles. One example of a metal oxide nanotube material consists essentially of a non-conductive metal oxide such as titanium dioxide. Titanium dioxide ($TiO_2$) has very good chemical stability in acidic and oxidative environments. However, titanium dioxide is a semiconductor and its electron conductivity is very low. As used herein, "non-conductive" refers to those metal oxides having insufficient electron conductivity to be used solely as the electron conductor in fuel cell catalyst and include metal oxides that do not conduct electrons as well as semi-conductors. The metal oxide nanotubes 12 can be any other non-conductive metal oxide known to those skilled in the art that can be formed in a nanotube, such as niobium pentoxide.

Figure 1B:
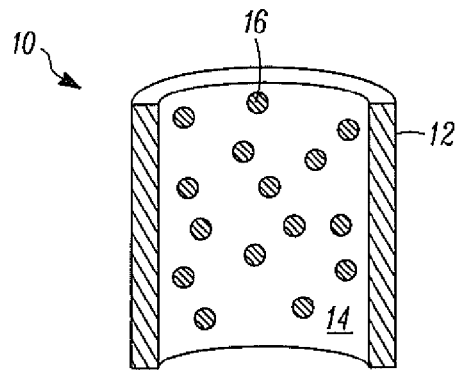
FIG. 1B is a cross-section of FIG. 1A along line 1-1.

FIG. 1B is a cross-sectional view of FIG. 1A cut along line 1-1. As illustrated in FIG. 1B, the conductive metal oxide particles 16 provide the requisite electron conductivity and can be uniformly impregnated across the internal support surface 14 of the metal oxide nanotube 12. The conductive metal oxide particles 16 can be, for example ruthenium dioxide, iridium oxide, or other oxides of ruthenium, such as ruthenium tetroxide ($RuO_4$). A uniform distribution of conductive metal particles 16 impregnated on the inner support surface 14 of the metal oxide nanotubes 12 can reduce or prevent agglomeration of the metal oxide, trapping fewer electrons in the agglomerate. The internal support surface 14 can be impregnated by coating the internal support surface 14 of the mental oxide nanotube with the conductive metal oxide and passing air through the metal oxide nanotube 12 to impregnate the internal support surface 14 with the conductive metal oxide particles 16.

Figure 2A:
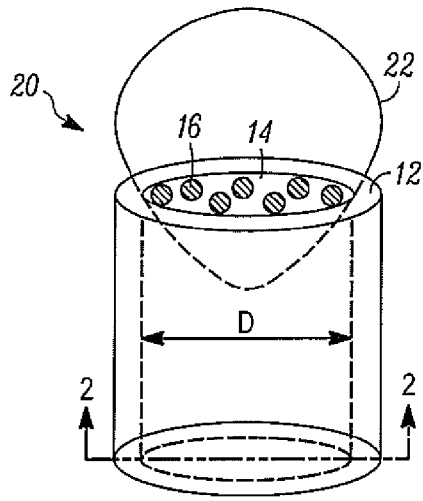
FIG. 2A is a schematic illustrating another embodiment of a support substrate for an electrocatalyst as disclosed herein.
Figure 2B:
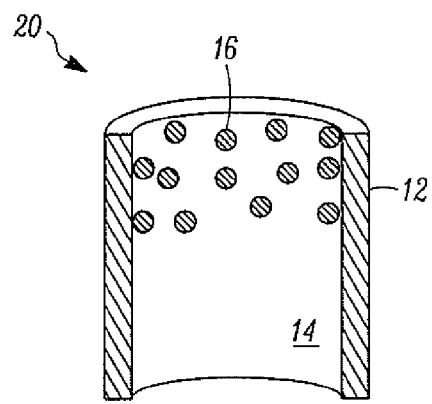
FIG. 2B is a cross-section of FIG. 2A along line 2-2.

FIG. 2A is a schematic of another support substrate 20 disclosed herein. The support substrate 20 comprises the metal oxide nanotube 12 of the first embodiment, having an internal support surface 14 with conductive metal oxide particles 16 impregnated on the internal support surface 14 to provide the requisite electron conductivity. FIG. 2B is a cross-sectional view of FIG. 2A cut along line 2-2. As illustrated in FIG. 2B, in this embodiment, the conductive metal oxide particles 16 are uniformly impregnated around the entire circumference but along only a portion of length of the internal support surface 14 of the metal oxide nanotube 12. The conductive metal oxide particles 16 are concentrated on one longitudinal end of the metal oxide nanotube 14, as illustrated. The impregnated portion can be between about 20% and 50% of the internal surface area 14 extending from one end inward along the length of the metal oxide nanotube 12. For example, the conductive metal oxide particles 16 can be concentrated in the top 20% of the internal surface area 14. As another example, the conductive metal oxide particles 16 can be concentrated in a top 50% of the internal surface area 14.

The internal diameter D (or pore diameter) of the metal oxide nanotube 12 of the support substrate 20 can be sized to prevent water from flowing through the metal oxide nanotube 12. A drop 22 of water is illustrated in FIG. 2A. The internal diameter D of the metal oxide nanotube 12 is sized such that the drop 22 sinks into the metal oxide nanotube 12 as illustrated, only enough to wet a portion of the internal support surface 14, while maintaining sufficient surface tension to prevent capillary action drawing the water drop 22 through the metal oxide nanotube 12. By limiting the internal diameter D so that water does not flow through the metal oxide nanotube 12, leaching and corrosion of the conductive metal particles 16 is reduced or eliminated.

The wall thickness of the metal oxide nanotube 12 can vary depending on the metal oxide material used and the loading. The wall thickness can be, for example, 50 nm or less. In particular, the wall thickness can be between about 10 nm and 50 nm.

Figure 3:
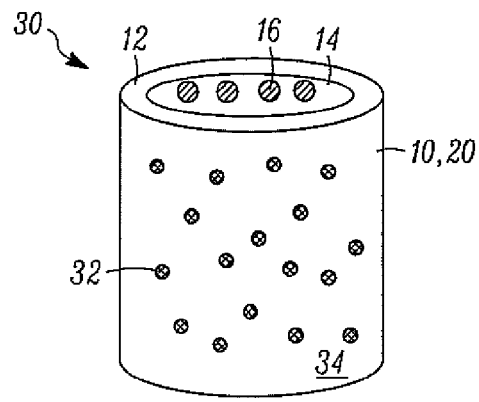
FIG. 3 is a schematic of an electrocatalyst having the support substrate supporting active catalyst particles as disclosed herein.

FIG. 3 is a schematic of an electrocatalyst 30 using the support substrate 10, 20 of FIGS. 1A, 1B and 2A, 2B. As shown in FIG. 3, active catalyst particles 32 are deposited on an exterior support surface 34 of the metal oxide nanotube 12. The active catalyst particles 32 can include one or a combination of precious metals such as platinum, gold, rhodium, ruthenium, palladium and iridium, and/or transition metals such as cobalt and nickel. The precious metal can be in various forms, such as alloys, nanowires, nanoparticles and coreshells. Because the conductive metal oxide particles 16 are impregnated on the inside support surface 14 of the metal oxide nanotube 12, the entire exterior support surface 34 is available to the active catalyst particles 32, increasing the available surface area on which the active catalyst particles 32 can be deposited.

Other embodiments of the support substrate disclosed herein are contemplated. For example, the metal oxide nanotube can be of a shape that provides corners between walls of the nanotube, such as a rectangular, square, polygon or triangle. The conductive metal oxide is impregnated on the internal support surface as shown in FIGS. 1A, 1B and 2A, 2B. The active catalyst particles are deposited on an exterior support surface as disclosed in FIG. 3. The active catalyst particles can be deposited uniformly over the entire exterior support surface. Alternatively, the active catalyst particles can be deposited on the corners of the shaped nanotube for improved adhesion and exposure to the fuel gas.

Figure 4A:
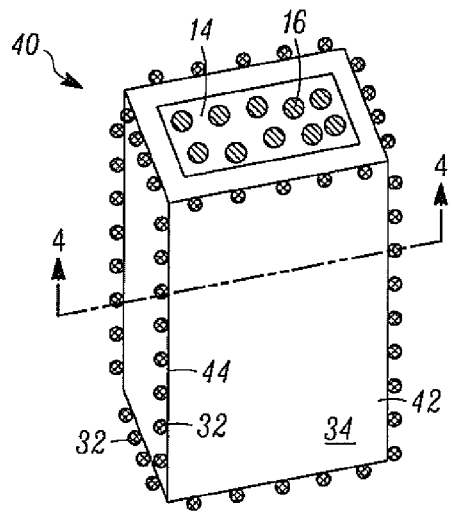
FIG. 4A is a schematic illustrating another embodiment of an electrocatalyst as disclosed herein.
Figure 4B:
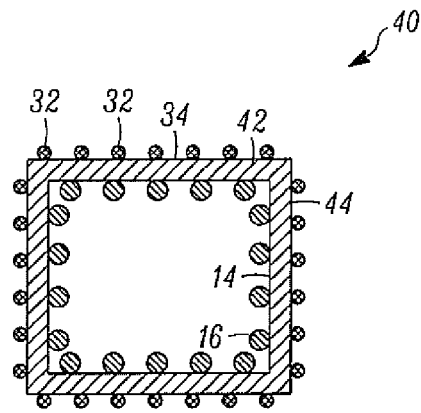
FIG. 4B is a cross-section of FIG. 4A along line 4-4.

FIGS. 4A, 4B and 5A, 5B illustrate embodiments of electrocatalyst using support substrates having shapes that provide corners. FIGS. 4A and 4B illustrate an electrocatalyst 40 having a square metal oxide nanotube 42. The conductive metal oxide particles 16 are impregnated on the internal support surface 14 of the square metal oxide nanotube 42. The conductive metal oxide particles 16 can be uniformly distributed over the entire internal support surface 14, as illustrated in FIG. 1B, or can be concentrated in only a portion of the internal support surface, as illustrated in FIG. 2B. The active catalyst particles 32 are deposited on the corners 44 of the exterior support surface 34 of the square metal oxide nanotube 42 as shown.

Figure 5A:
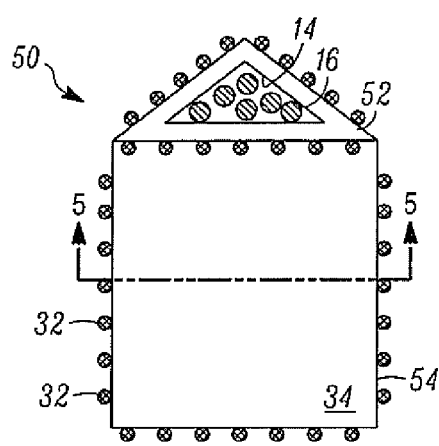
FIG. 5A is a schematic illustrating another embodiment of an electrocatalyst as disclosed herein.
Figure 5B:
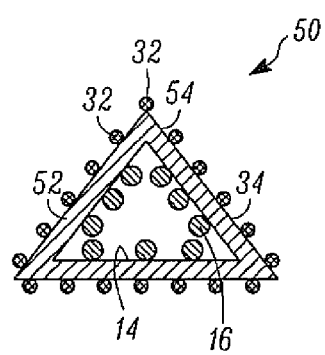
FIG. 5B is a cross-section of FIG. 5A along line 5-5.

FIGS. 5A and 5B illustrate an electrocatalyst 50 having a triangular metal oxide nanotube 52. The conductive metal oxide particles 16 are impregnated on the internal support surface 14 of the triangular metal oxide nanotube 52. The conductive metal oxide particles 16 can be uniformly distributed over the entire internal support surface 14, as illustrated in FIG. 1B, or can be concentrated in only a portion of the internal support surface, as illustrated in FIG. 2B. The active catalyst particles 32 are deposited on the corners 54 of the exterior support surface 34 of the triangular metal oxide nanotube 52 as shown.

Figure 6:
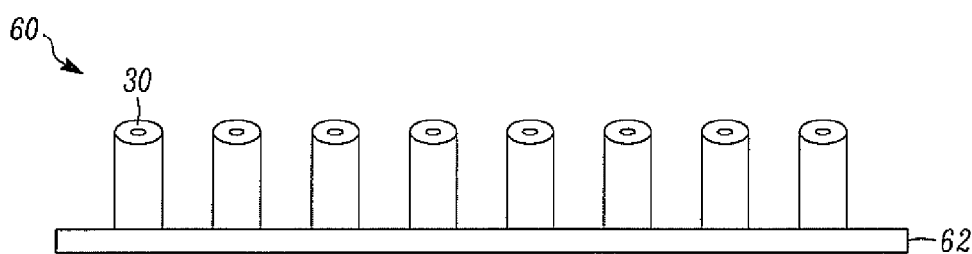
FIG. 6 is a side view schematic of a gas diffusion layer coated with an electrocatalyst as disclosed herein.

Also disclosed herein are electrodes comprising any of the embodiments of electrocatalysts 30, 40, 50 disclosed herein. FIG. 6 is a schematic of an electrode 60 comprising the electrocatalyst 30 disclosed in FIG. 3 coated on a gas diffusion layer 62. As illustrated in FIG. 6, the electrocatalyst 30 is coated on the gas diffusion layer 62 such that the metal oxide nanotubes 12 extend from the gas diffusion layer 62 in a substantially parallel standing arrangement. In embodiments where the conductive metal oxides 16 are concentrated on one end of the internal support surface 14, such as described with reference to FIG. 2B, the conductive metal oxide particles 16 are concentrated on the internal support surface 14 at an end of the metal oxide nanotube 12 opposite the gas diffusion layer 62, on a membrane side.

Alternatively, the electrocatalyst 30 can be coated on the gas diffusion layer 62 such that the metal oxide nanotubes 12 are randomly positioned on the gas diffusion layer 62. In such a case, the conductive metal oxide particles 16 can be uniformly distributed along the entire internal support surface 14 rather than just along a portion of the internal support surface 14 to ensure the requisite electron conductivity.

Figure 7:
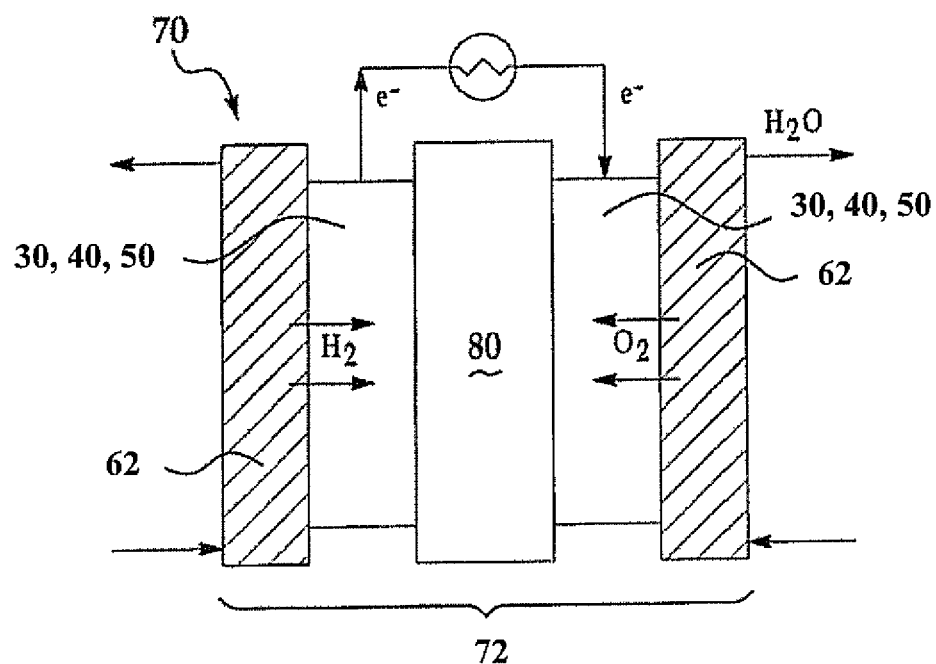
FIG. 7 is a schematic of a fuel cell using the electrocatalyst disclosed herein.

FIG. 7 illustrates the use of the electrocatalyst disclosed herein in a fuel cell. FIG. 7 is a schematic of a fuel cell 70, a plurality of which makes a fuel cell stack. The fuel cell 70 is comprised of a single membrane electrode assembly 72. The membrane electrode assembly 72 has a membrane 80 coated with the electrocatalyst 30, 40, 50 with a gas diffusion layer 62 on opposing sides of the membrane 80. The membrane 80 has a layer of the electrocatalyst 30, 40, 50 formed on opposing surfaces of the membrane 80, such that when assembled, the layers of the electrocatalyst 30, 40, 50 are each between the membrane 80 and a gas diffusion layer 62. Alternatively, a gas diffusion electrode is made by forming one layer of the electrocatalyst 30, 40, 50 on a surface of each gas diffusion layer 62 and sandwiching the membrane 80 between the coated gas diffusion layers 62 such that the layers of electrocatalyst 30, 40, 50 contact the membrane 80. When fuel, such as hydrogen gas (shown as $H_2$), is introduced into the fuel cell 70, the layer of electrocatalyst 30, 40, 50 splits hydrogen gas molecules into protons and electrons. The protons pass through the membrane 80 to react with the oxidant (shown as $O_2$), such as oxygen or air, forming water ($H_2O$). The electrons ($e^-$), which cannot pass through the membrane 80, must travel around it, thus creating the source of electrical energy.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrocatalyst comprising:
   a support substrate comprising:
      a metal oxide nanotube consisting of titanium dioxide having an internal support surface and an exterior support surface; and
      conductive metal oxide particles consisting of ruthenium dioxide and impregnated only on the internal support surface; and
   active catalyst particles deposited only on the exterior support surface, wherein the conductive metal oxide particles and the active catalyst particles are different materials.

2. The electrocatalyst of claim 1, wherein the conductive metal oxide particles are evenly distributed across the internal support surface.

3. The electrocatalyst of claim 1, wherein the conductive metal oxide particles are concentrated on one longitudinal end of the metal oxide nanotube.

4. The electrocatalyst of claim 1, wherein the active catalyst particles are platinum.

5. The electrocatalyst of claim 1, wherein the metal oxide nanotube has a triangular cross section.

6. The electrocatalyst of claim 5, wherein the active catalyst particles are deposited only on corners of the exterior support surface of the metal oxide nanotube.

7. The electrocatalyst support of claim 1, wherein the metal oxide nanotube has a square cross section.

8. The electrocatalyst of claim 7, wherein the active catalyst particles are deposited only on corners of the exterior support surface of the metal oxide nanotube.

9. An electrode comprising:
   the electrocatalyst of claim 1; and
   a gas diffusion layer on which the electrocatalyst is coated.

10. The electrode of claim 9, wherein the metal oxide nanotube is a titanium dioxide nanotube and the conductive metal oxide is ruthenium dioxide.

11. The electrode of claim 9, wherein the electrocatalyst is coated on the gas diffusion layer such that the metal oxide nanotubes extend from the gas diffusion layer in a parallel standing arrangement.

12. The electrode of claim 11, wherein the conductive metal oxide is concentrated on the internal support surface at an end of the metal oxide nanotube opposite the gas diffusion layer.

13. The electrode of claim 9, wherein the electrocatalyst is coated on the gas diffusion layer such that the metal oxide nanotubes are randomly positioned on the gas diffusion layer.

14. The electrode of claim 13, wherein the conductive metal oxide is evenly distributed on the internal support surface of the metal oxide nanotube.

15. The electrode of claim 9 wherein the metal oxide nanotube has one of a triangular cross section and a square cross section.

16. The electrode of claim 15, wherein the active catalyst particles are deposited only on corners of the exterior support surface of the metal oxide nanotube.

17. An electrocatalyst comprising:
   a support substrate comprising:
      a metal oxide nanotube having an internal support surface and an exterior support surface, wherein the metal oxide nanotube has a triangular cross section or a square cross section; and
      conductive metal oxide particles impregnated only on the internal support surface; and
   active catalyst particles deposited only on the exterior support surface, wherein the conductive metal oxide particles and the active catalyst particles are different materials.

\* \* \* \* \*